United States Patent
Jia et al.

(10) Patent No.: US 12,050,336 B2
(45) Date of Patent: Jul. 30, 2024

(54) DISPLAY PANEL AND TRANSPARENT DISPLAY APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Nanfang Jia, Beijing (CN); Long Wang, Beijing (CN); Liye Duan, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 170 days.

(21) Appl. No.: 17/631,350

(22) PCT Filed: Apr. 13, 2021

(86) PCT No.: PCT/CN2021/086786
§ 371 (c)(1),
(2) Date: Jan. 28, 2022

(87) PCT Pub. No.: WO2021/238466
PCT Pub. Date: Dec. 2, 2021

(65) Prior Publication Data
US 2022/0283358 A1 Sep. 8, 2022

(30) Foreign Application Priority Data

May 27, 2020 (CN) .......................... 202010464378.2

(51) Int. Cl.
*F21V 8/00* (2006.01)
*G02F 1/1334* (2006.01)
(Continued)

(52) U.S. Cl.
CPC ......... *G02B 6/0068* (2013.01); *G02B 6/0023* (2013.01); *G02B 6/009* (2013.01);
(Continued)

(58) Field of Classification Search
None
See application file for complete search history.

(56) References Cited

U.S. PATENT DOCUMENTS

| | | | |
|---|---|---|---|
| 2012/0154711 | A1 | 6/2012 | Park et al. |
| 2013/0016307 | A1 | 1/2013 | Jeong et al. |

(Continued)

FOREIGN PATENT DOCUMENTS

| | | |
|---|---|---|
| CN | 102879925 A | 1/2013 |
| CN | 203519976 U | 4/2014 |

(Continued)

OTHER PUBLICATIONS

The First Office Action for Chinese Patent Application No. 202010464378.2 Issued by the Chinese Patent Office on Nov. 30, 2021.

(Continued)

*Primary Examiner* — Richard H Kim
(74) *Attorney, Agent, or Firm* — IP & T GROUP LLP

(57) ABSTRACT

A display panel includes a liquid crystal cell, a light guide plate, and at least one light source. The light guide plate is attached to a surface of the liquid crystal cell in a thickness direction of the liquid crystal. The light guide plate includes a first surface, a second surface and side surfaces. In a thickness direction of the light guide plate, the first surface is opposite to the second surface, and the side faces are located between the first surface and the second surface. The first surface is closer to the liquid crystal cell than the second surface. A light source is disposed on at least a partial region in at least one side face. The light guide plate is configured (Continued)

such that light incident on the second surface in light from the light source is totally reflected, and then exits from the first surface.

12 Claims, 8 Drawing Sheets

(51) Int. Cl.
    *G02F 1/1335*     (2006.01)
    *G02F 1/13357*     (2006.01)
    *G02F 1/1337*     (2006.01)
    *G02F 1/1343*     (2006.01)

(52) U.S. Cl.
    CPC .. *G02F 1/133512* (2013.01); *G02F 1/133621* (2013.01); *G02F 1/133742* (2021.01); *G02F 1/133784* (2013.01); *G02F 1/134309* (2013.01); *G02F 1/1334* (2013.01); *G02F 2201/56* (2013.01); *G02F 2202/28* (2013.01); *G02F 2203/01* (2013.01)

(56) References Cited

U.S. PATENT DOCUMENTS

| | | | |
|---|---|---|---|
| 2016/0097893 A1 | 4/2016 | Sohn et al. | |
| 2016/0186960 A1* | 6/2016 | Kim | G02F 1/1336 349/71 |
| 2018/0031875 A1 | 2/2018 | Qin et al. | |
| 2018/0059847 A1* | 3/2018 | Wang | G06F 3/0414 |
| 2018/0120494 A1 | 5/2018 | Yoo | G02B 6/0025 |
| 2018/0321477 A1* | 11/2018 | Kuksenkov | G02B 19/0061 |
| 2019/0033507 A1 | 1/2019 | Wang et al. | |
| 2019/0108798 A1* | 4/2019 | Ishihara | G09G 3/3426 |
| 2021/0011212 A1* | 1/2021 | Hsu | G02B 6/0053 |
| 2021/0349253 A1 | 11/2021 | Leng et al. | |

FOREIGN PATENT DOCUMENTS

| | | |
|---|---|---|
| CN | 105487161 A | 4/2016 |
| CN | 105974672 A | 9/2016 |
| CN | 107422532 A | 12/2017 |
| CN | 210038403 U | 2/2020 |
| CN | 110928046 A | 3/2020 |
| CN | 210429131 U | 4/2020 |
| CN | 111487710 A | 8/2020 |
| KR | 10-2012-0009841 A | 2/2012 |
| WO | 2018/076900 A1 | 5/2018 |

OTHER PUBLICATIONS

The Second Office Action for Chinese Patent Application No. 202010464378.2 issued by the Chinese Patent Office on Jun. 14, 2022.

* cited by examiner

DISPLAY PANEL AND TRANSPARENT DISPLAY APPARATUS

CROSS-REFERENCE TO RELATED APPLICATIONS

This application is a national phase entry under 35 USC 371 of International Patent Application No. PCT/CN2021/086786, filed on Apr. 13, 2021, which claims priority to Chinese Patent Application No. 202010464378.2, filed on May 27, 2020, which are incorporated herein by reference in their entirety.

TECHNICAL FIELD

The present disclosure relates to the field of display technologies, and in particular, to a display panel and a transparent display apparatus.

BACKGROUND

A transparent display apparatus is a display apparatus that enables users to view a display image on the transparent display apparatus and a scene or an object behind the transparent display apparatus simultaneously. The transparent display apparatus may realize fusion and interaction between the display image on a display screen in the transparent display apparatus and the scene or the object behind the transparent display apparatus, thereby bringing a brand-new, rich and expressive visual experience to the users.

SUMMARY

In an aspect, a display panel is provided. The display panel includes a liquid crystal cell, a light guide plate and at least one light source. The light guide plate is attached to a surface of the liquid crystal cell in a thickness direction of the liquid crystal cell. The light guide plate includes a first surface, a second surface and side faces. In a thickness direction of the light guide plate, the first surface is opposite to the second surface, and the side faces are located between the first surface and the second surface. The first surface is closer to the liquid crystal cell than the second surface. A light source is disposed on at least a partial region in at least one side face of the light guide plate. The light guide plate is configured such that light incident on the second surface in light from the light source is totally reflected, and then exits from the first surface.

In some embodiments, the display panel further includes an adhesive layer. The adhesive layer is disposed between the light guide plate and the liquid crystal cell. The first surface of the light guide plate is attached to the liquid crystal cell through the adhesive layer.

In some embodiments, a refractive index of the light guide plate is in a range from 1.4 to 1.6, inclusive.

In some embodiments, the display panel further includes an adhesive layer. The adhesive layer is disposed between the light guide plate and the liquid crystal cell. The first surface of the light guide plate is attached to the liquid crystal cell through the adhesive layer. A refractive index of the adhesive layer is in a range from 1.33 to 1.52, inclusive.

In some embodiments, an orthographic projection of the light guide plate on a plane perpendicular to a thickness direction of the display panel is in a shape of a quadrangle; and the light source is disposed on a long edge of the quadrangle.

In some embodiments, a length of at least one short edge of the quadrangle is less than or equal to 6 cm.

In some embodiments, an orthographic projection of the light guide plate on a plane perpendicular to a thickness direction of the display panel has an arc-shaped edge; and the light source is disposed around the side faces of the light guide plate.

In some embodiments, a thickness of the light guide plate is less than or equal to 4 mm.

In some embodiments, a half-value angle of the light source is in a range from 45° to 75°, inclusive.

In some embodiments, the light source is a Lambertian light source.

In some embodiments, the light source includes at least one light-emitting device for emitting light with a first color, at least one light-emitting device for emitting light with a second color and at least one light-emitting device for emitting light with a third color. The light source is configured such that, in response to pulse control signals, the light-emitting device for emitting light with the first color, the light-emitting device for emitting light with the second color and the light-emitting device for emitting light with the third color emit light with corresponding colors sequentially and periodically.

In some embodiments, the display panel further includes a timing controller coupled to the light source. The timing controller is used to output a pulse control signal to control a work cycle of each light-emitting device in the light source.

In some embodiments, the liquid crystal cell includes an array substrate, an opposite substrate and a liquid crystal layer. The opposite substrate is disposed opposite to the array substrate in the thickness direction of the liquid crystal cell, and the opposite substrate is farther away from the light guide plate than the array substrate. The liquid crystal layer is disposed between the array substrate and the opposite substrate.

In some embodiments, the liquid crystal layer includes liquid crystal molecules and polymer molecules.

In some embodiments, the opposite substrate includes a second base, a common electrode disposed on the second base, and a light-shielding pattern disposed on the second base and located on side faces of the common electrode, the common electrode is closer to the liquid crystal layer than the second base. An outer edge of an orthographic projection of the light source on the second base exceeds an outer edge of an orthographic projection of the light-shielding pattern on the second base.

In some embodiments, the array substrate includes a first alignment layer. The opposite substrate includes a second alignment layer. At least one orthographic projection, on a plane perpendicular to a thickness direction of the display panel, of the at least one side face where the light source is located of the light guide plate is a straight line. A rubbing direction of the first alignment layer and a rubbing direction of the second alignment layer are both perpendicular to a normal direction of at least one region, on which the light source is provided, in a side face of the light guide plate.

In some embodiments, the display panel further includes at least one light homogenizing film. A light-homogenizing film is located between the light source and a side face of the light guide plate.

In some embodiments, a shape of a display area for normal display of the display panel is approximately the same as a shape of an orthographic projection of the light guide plate on a plane perpendicular to a thickness direction of the display panel.

In some embodiments, an area of the display area for normal display of the display panel is less than an area of the orthographic projection of the light guide plate on the plane.

In another aspect, a transparent display apparatus is provided. The transparent display apparatus includes the display panel as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
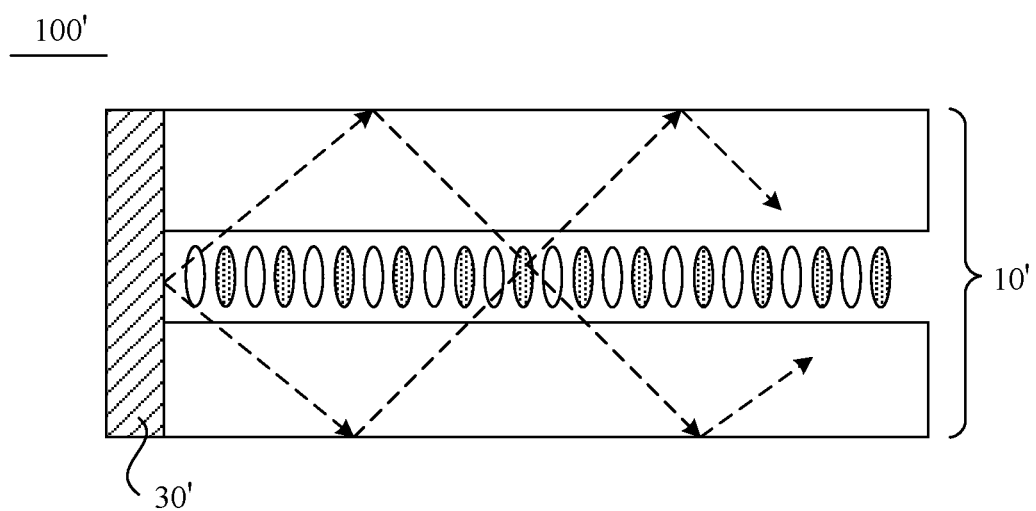
FIG. 1 is a structural diagram of a display panel in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" and "some examples" are intended to indicate that specific features, structures or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, terms such as "coupled" and "connected" and their derivatives may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The use of "applicable to" or "configured to" herein means an open and inclusive expression, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value other than those stated.

As used herein, the term such as "about" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

With regard to a conventional liquid crystal display panel, since it includes film structures such as a polarizer and a color filter, its light transmittance is relatively low (e.g., less than 10%). Therefore, a transparent display apparatus based on the conventional liquid crystal display panel has relatively low brightness and relatively low utilization rate of light. With regard to a light-emitting diode (LED) display panel, pixels of a transparent display apparatus based on the LED display panel are relatively large due to a relatively large size of LEDs. Therefore, the light-emitting diode (LED) display panel is suitable for a large-sized transparent display apparatus, but is not suitable for a small-sized transparent display apparatus. With regard to a transparent display apparatus based on a Micro-LED display panel, a size of Micro-LEDs is relatively small, but a cost of the transparent display apparatus is relatively high. With regard to a transparent display apparatus based on an organic light-emitting diode (OLED) display panel, its light transmittance is less than 68%, and its cost is relatively high and its service life is difficult to guarantee.

A transparent display apparatus based on a scattering display panel has a relatively high light transmittance (e.g., up to 80% or more), and a process of manufacturing the transparent display apparatus based on the scattering display panel is similar to a process of manufacturing the conventional liquid crystal display panel. Therefore, its cost is relatively low, its reliability is relatively high, and its service life is relatively long.

However, a display panel 100' shown in FIG. 1 includes a liquid crystal cell 10' and a light source 30'. The light source 30' is attached to a side face of the liquid crystal cell 10' in a direction perpendicular to a thickness of the liquid crystal cell 10', and light enters the liquid crystal cell 10' from the side face of the liquid crystal cell 10'. In a process where light emitted by the light source 30' propagates in the liquid crystal cell 10', film layers (e.g., metal wiring layers) in the liquid crystal cell 10' will scatter the light, and light loss is relatively large, which causes that display uniformity between a region closer to the light source 30' and a region farther away from the light source 30' is poor in a display process of the liquid crystal cell 10'. For example, a brightness of the region farther away from the light source 30' is less than 10% of a brightness of the region closer to the light source 30'. As a result, there is a decrease in display contrast, which is difficult to meet actual display requirements.

Figure 2:
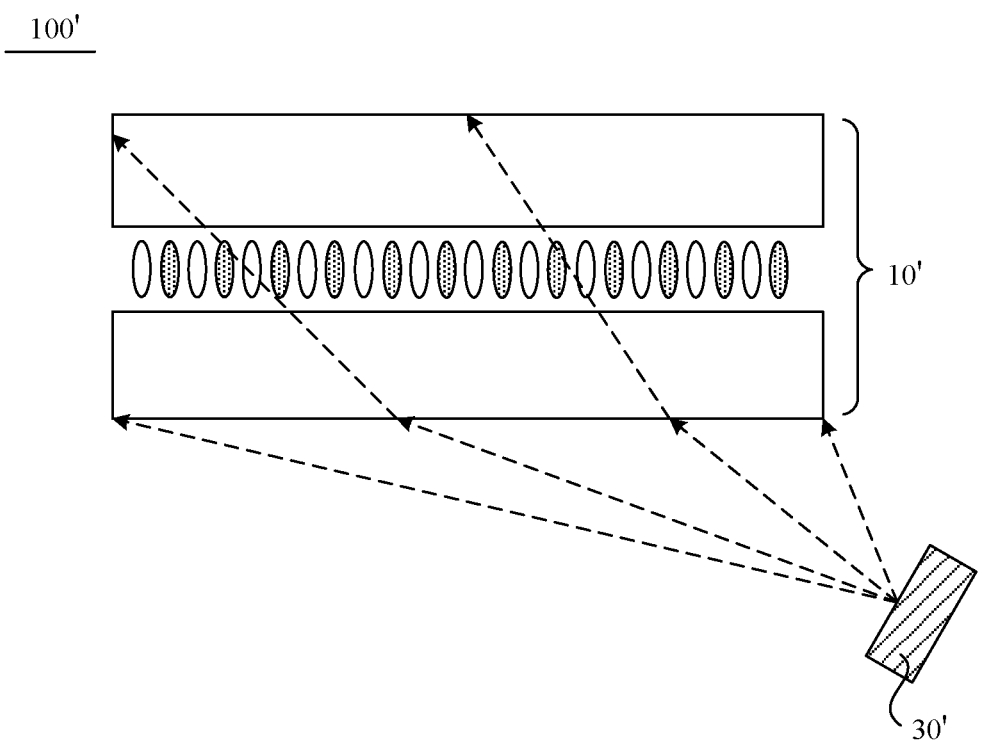
FIG. 2 is a structural diagram of another display panel in the related art.

Moreover, in the display panel 100' shown in FIG. 2, the light source 30' is disposed outside the liquid crystal cell 10', e.g., at a side of the liquid crystal cell 10' away from a display surface, and the light emitted from the light source 30' is projected to the side of the liquid crystal cell 10' away from the display surface to provide the liquid crystal cell 10' with light required for display. In this case, a size of the light source 30' is relatively large, which causes that a size of the display panel 100' is also relatively large, and thus it is difficult for the display panel 100' to be applied to a small-sized display apparatus.

Figure 3:
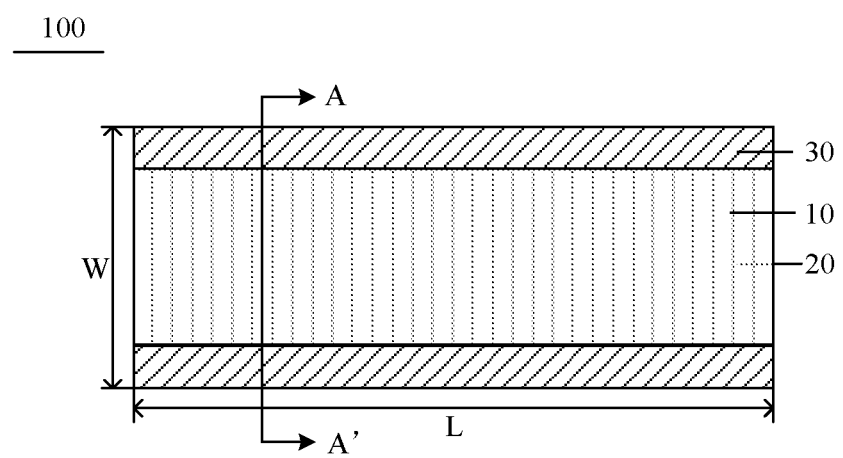
FIG. 3 is a top view of a display panel, in accordance with some embodiments of the present disclosure.
Figure 4:
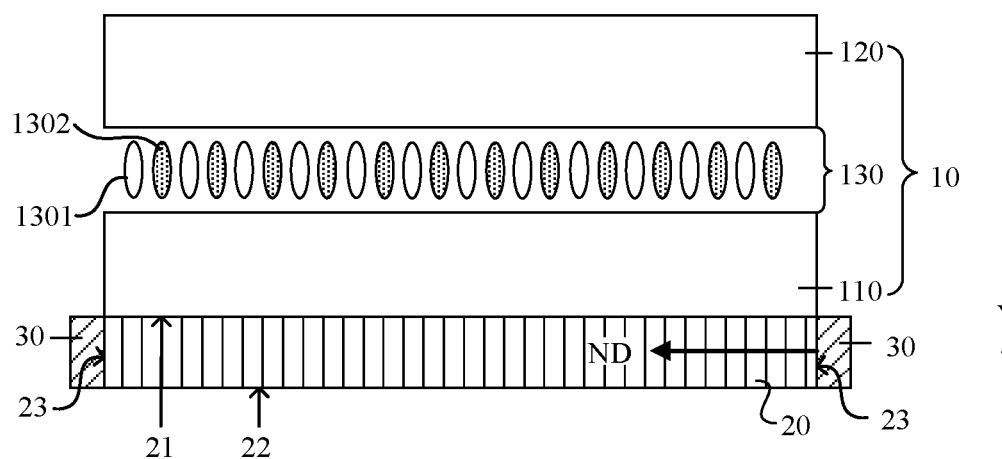
FIG. 4 is a sectional view of the display panel in FIG. 3 taken along the line A-A'.

Embodiments of the present disclosure provide a display panel 100. As shown in FIGS. 3 and 4, the display panel 100 includes a liquid crystal cell 10, a light guide plate 20 and light source(s) 30.

In a thickness direction of the liquid crystal cell 10 (e.g., in a vertical direction Y shown in FIG. 4), the light guide plate 20 is attached to a surface of the liquid crystal cell 10.

The light guide plate 20 includes a first surface 21, a second surface 22 and side faces 23.

A light source 30 is disposed on at least a partial region in the side face(s) 23 of the light guide plate 20.

In a thickness direction of the light guide plate 20 (e.g., in the vertical direction Y shown in FIG. 4), the first surface 21 is opposite to the second surface 22, and the side faces 23 are located between the first surface 21 and the second surface 22. Moreover, the first surface 21 is closer to the liquid crystal cell 10 than the second surface 22.

It will be understood that the first surface 21 of the light guide plate 20 is attached to the liquid crystal cell 10.

For example, the light guide plate 20 is transparent. The light guide plate 20 may be light guide glass.

The light guide plate 20 is configured such that light incident on the second surface 22 in light from the light source 30 is totally reflected, and then exits from the first surface 21.

In some embodiments, a refractive index of the light guide plate 20 is in a range from 1.4 to 1.6, inclusive. For example, the refractive index of the light guide plate 20 is 1.51314.

It will be understood that the second surface 22 of the light guide plate 20 is in contact with the air. Since the refractive index of the light guide plate 20 is greater than a refractive index of the air, the light incident on the second surface 22 in the light from the light source 30 is equivalent to propagating from an optically denser medium (i.e., the light guide plate 20) to an optically rarer medium (i.e., the air), and then the light incident on the second surface 22 is totally reflected at an interface (i.e., the second surface 22) between the optically denser medium and the optically rarer medium.

Figure 5:
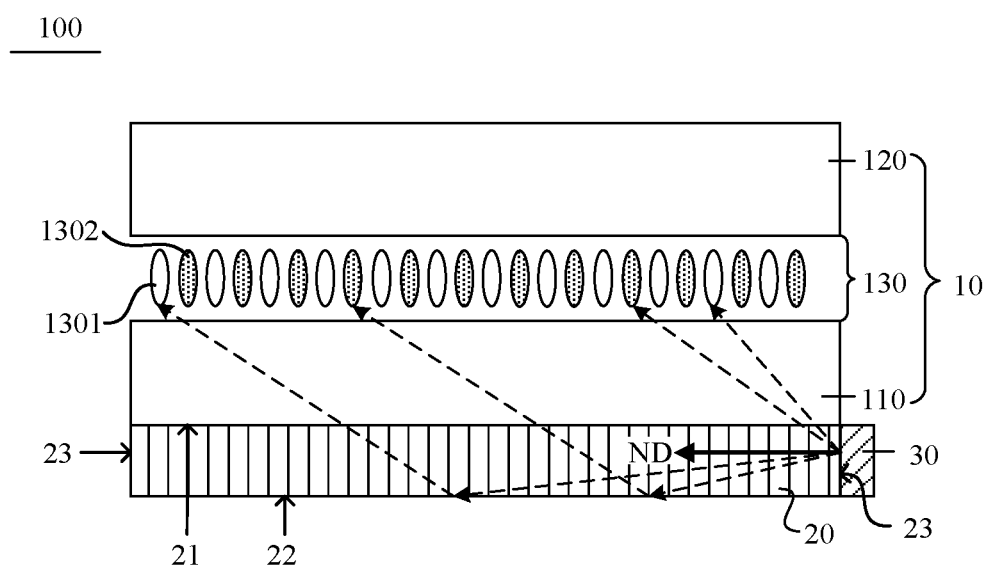
FIG. 5 is a structural diagram of a display panel, in accordance with some embodiments of the present disclosure.

In this case, as shown in FIG. 5, after the light emitted by the light source 30 enters the light guide plate 20, a part of the light passes through the light guide plate 20 and enters the liquid crystal cell 10; another part of the light is incident onto the second surface 22 of the light guide plate 20 and is totally reflected by the second surface 22, and then propagates to the first surface 31 and exits from the first surface 21. After the light emitted by the light source 30 enters the light guide plate 20, light incident onto the first surface 21 exits from the first surface 21. Thus, the light from the light source 30 enters the light guide plate 20, exits from the first surface 21 of the light guide plate 20, and then enters the liquid crystal cell 10, so as to provide the liquid crystal cell 10 with the light required for display.

In the display panel 100 provided in the embodiments of the present disclosure, the light guide plate 20 is attached to the surface of the liquid crystal cell 10 in the thickness direction of the liquid crystal cell 10, the light source 30 is disposed on at least the partial region in the side face(s) 23 of the light guide plate 20. The light incident on the second surface 22 of the light guide plate 2 in the light from the light source 30 is totally reflected and exits from the first surface 21 of the light guide plate 20. In addition, the light incident on the second surface 22 and totally reflected may propagate towards a region of the light guide plate 20 farther away from the light source 30. Therefore, compared to the display panel 100' in FIG. 1, in the display panel 100 of the embodiments of the present disclosure, the light is not affected by film layers in the liquid crystal cell 10 during propagation from a region of the light guide plate 20 closer to the light source 30 to the region of the light guide plate 20 farther away from the light source 30, thereby reducing the loss of the light during the propagation, and increasing a brightness of the region farther away from the light source 30. As a result, the brightness uniformity and the contrast are improved. Moreover, compared to the display panel 100' in FIG. 2, the display panel 100 in the embodiments of the present disclosure has a relatively small size, and when the display panel 100 is applied to a display apparatus, a volume of the display apparatus is reduced, and thus the display panel 100 is suitable for the small-sized display apparatus.

Figure 6:
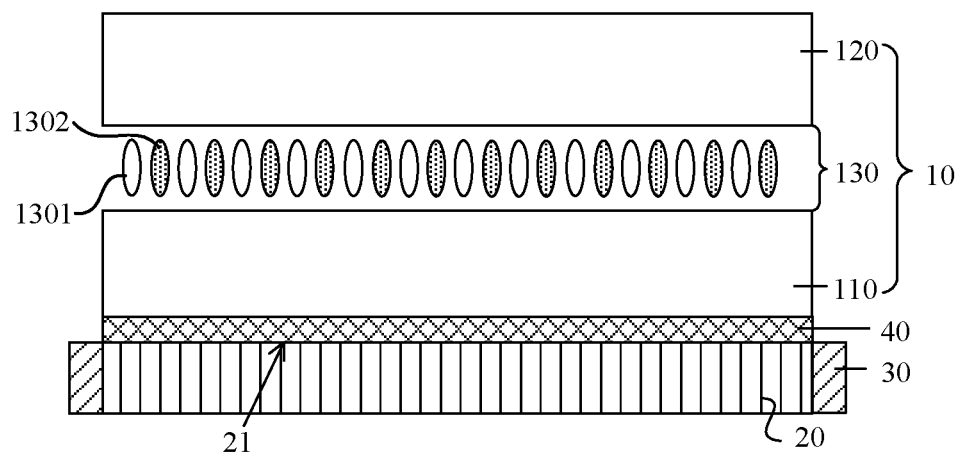
FIG. 6 is a structural diagram of another display panel, in accordance with some embodiments of the present disclosure.

In some embodiments, as shown in FIG. 6, the display panel 100 further includes an adhesive layer 40.

The adhesive layer 40 is disposed between the light guide plate 20 and the liquid crystal cell 10.

The first surface 21 of the light guide plate 20 is attached to the liquid crystal cell 10 through the adhesive layer 40.

It will can understood that the light exiting from the first surface 21 of the light guide plate 20 enters the liquid crystal cell 10 after being refracted by the adhesive layer 40.

The adhesive layer 40 is transparent, so that a transmittance of the adhesive layer 40 is relatively high, which may reduce the light loss.

It will be noted that, in a case where a brightness of the light from the light guide plate 20 entering the liquid crystal cell 10 is guaranteed, a material of the adhesive layer 40 may be selected according to actual situations. For example, the material of the adhesive layer 40 includes optically clear adhesive (OCA), liquid optical clear adhesive (LOCA) or ultraviolet curable adhesive.

In some embodiments, a refractive index of the adhesive layer 40 is in a range from 1.33 to 1.52, inclusive. For example, the refractive index of the adhesive layer 40 is 1.50.

In this case, the refractive index of the adhesive layer 40 is matched with the refractive index of the light guide plate 20, so that the display panel 100 has good brightness uniformity.

Figure 14:
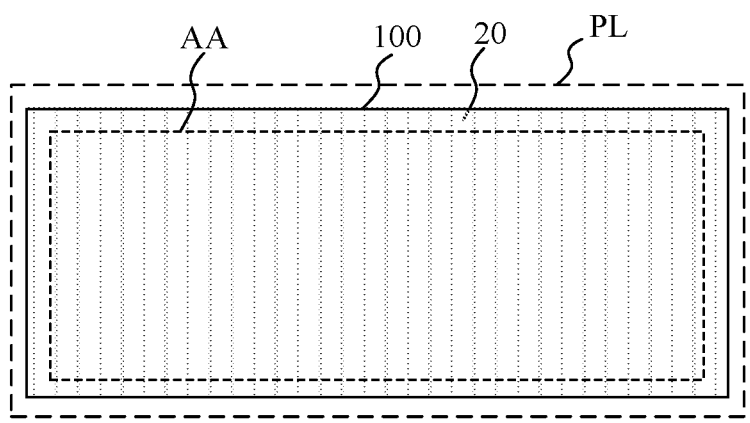
FIG. 14 is a structural diagram of yet another display panel, in accordance with some embodiments of the present disclosure.

In some embodiments, as shown in FIG. 14, an orthographic projection of the light guide plate 20 on a plane PL perpendicular to a thickness direction of the display panel 100 is in a shape of a quadrangle. As shown in FIG. 3, the light source 30 is disposed on a side of a long edge L of the quadrangle.

For example, a length of long edge(s) L of the quadrangle may be greater than or equal to 12 cm.

In some embodiments, as shown in FIG. 3, a length of short edge(s) W of the quadrangle is less than or equal to 6 cm.

In this case, it is possible to avoid a problem that the brightness uniformity of the display panel 100 is poor, which is caused by the fact that the size of the display panel 100 is relatively large (for example, the length of the short edge(s) W of the quadrangle gradually increases, and thus a brightness of a region, farther away from the light source 30, in the display panel 100 is less than 50% of a brightness of a region, closer to the light source 30, in the display panel 100). Therefore, the display effect of the display panel 100 is ensured.

For example, through a simulation test, for the display panel 100' shown in FIG. 1 in the related art, a ratio of an irradiance of light in a region farther away from the light source 30' to an irradiance of light in a region closer to the light source 30' is approximately 17%. Whereas, for the display panel 100 shown in FIG. 3 in the embodiments of the present disclosure, a ratio of an irradiance of light in the region farther away from the light source 30 to an irradiance of light in the region closer to the light source 30 is approximately 60%. Therefore, the display uniformity of the display panel 100 is improved, thereby improving the display effect.

Figure 7:
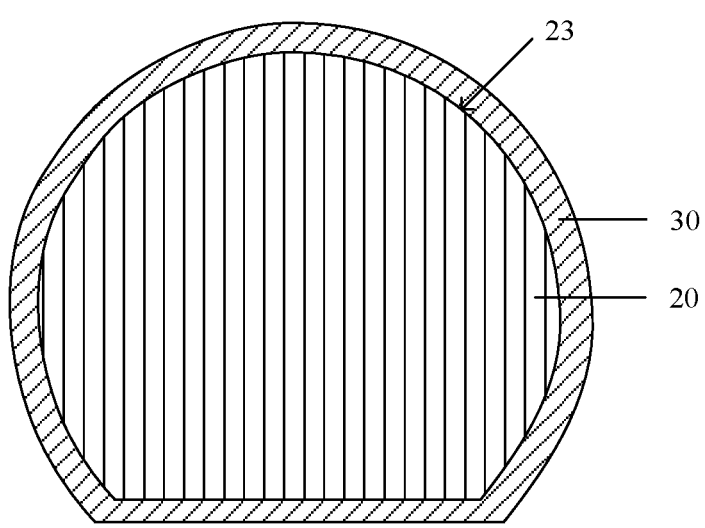
FIG. 7 is a top view of another display panel, in accordance with some embodiments of the present disclosure.

In some embodiments, as shown in FIG. 7, the orthographic projection of the light guide plate 20 on the plane PL has an arc-shaped edge.

As shown in FIG. 7, the light source 30 is disposed around the side faces of the light guide plate 20.

For example, referring to FIG. 7, a radius of the arc-shaped edge of the orthographic projection of the light guide plate 20 is approximately 25 mm, and a length of a straight line-shaped edge of the orthographic projection of the light guide plate 20 is approximately 24 mm.

It will be noted that, the light guide plate 20 may be bonded to a circuit board at the straight line-shaped edge of the orthographic projection of the light guide plate 20.

In this case, compared to a case where the light source 30 is only provided on a side of the straight line-shaped edge of the orthographic projection (including the arc-shaped edge and the straight line-shaped edge) of the light guide plate 20 on the plane PL, or compared to a case where the light source 30 is only provided on a side of the arc-shaped edge of the orthographic projection (including the arc-shaped edge and the straight line-shaped edge) of the light guide plate 20 on the plane PL, the light source 30 in the embodiments of the present disclosure is provided on both the side of the straight line-shaped edge of the orthographic projection of the light guide plate 20 on the plane PL and the side of the arc-shaped edge of the orthographic projection of the light guide plate 20 on the plane PL, which may improve an overall brightness and the uniformity of the display panel 100.

For example, through the simulation test, in a case where an orthographic projection of the display panel 100' in FIG. 1 on a plane perpendicular to a thickness direction of the display panel 100' has an arc-shaped edge, and the light source 30' is disposed on the arc-shaped edge, a brightness of a center of the display panel 100' is approximately 26% of a brightness of a position of the display panel 100' proximate to the light source 30'. However, a brightness of a center of the display panel 100 in FIG. 7 is approximately 72% of a brightness of a position of the display panel 100 proximate to the light source 30. Therefore, the brightness uniformity of the display panel 100 provided in the embodiments in the present disclosure is improved.

In some embodiments, as shown in FIG. 14, a shape of a display area AA for normal display of the display panel 100 is approximately the same as a shape of the orthographic projection of the light guide plate 20 on the plane PL. Moreover, an area of the display area AA for normal display of the display panel 100 is less than an area of the orthographic projection of the light guide plate 20 on the plane PL.

For example, in a case where a shape of the orthographic projection of the light guide plate 20 on the plane PL is approximately circular, a shape of an orthographic projection of the display panel 100 on the plane PL is also approximately circular. The display panel 100 in this shape may be applied to a display apparatus such as a smart watch.

It will be noted that those skilled in the art can design the shape of the light guide plate 20 according to actual situations. For example, the orthographic projection of the light guide plate 20 on the plane PL is in the shape of the quadrangle or has the arc-shaped edge; in addition, the orthographic projection of the light guide plate 20 on the plane PL may also be in a shape of a pentagon, a hexagon or an ellipse, and on this basis, the orthographic projection of the display panel 100 on the plane PL may also be in a shape of a pentagon, a hexagon or an ellipse accordingly. The present disclosure is not limited thereto.

In some embodiments, a thickness of the light guide plate 20 is less than or equal to 4 mm. For example, the thickness of the light guide plate 20 is 1 mm or 2 mm. In this way, the display panel 100 may be suitable for the small-sized display apparatus, so as to meet appearance requirements of the small-sized display apparatus.

In some embodiments, a half-value angle of the light source 30 is in a range from 45° to 75°. For example, the half-value angle of the light source 30 is 60°.

In some embodiments, the light source 30 is a Lambertian light source. For example, the light source 30 includes light-emitting diode(s) (LED(s)).

The light source 30 is a surface light source.

refractive index of the light guide plate 20, the better the uniformity of the display panel 100; and in a case where the refractive index of the light guide plate 20, the thickness of the light guide plate 20 and the half-value angle of the light source 30 are all unchanged, a change in the refractive index of the adhesive layer 40 has little influence on the uniformity of the display panel 100.

In some embodiments, as shown in FIG. 14, the light source 30 includes light-emitting device(s) for emitting light with a first color 301, light-emitting device(s) for emitting light with a second color 302 and light-emitting device(s) for emitting light with a third color 303.

The light source 30 is configured such that, in response to pulse control signals, the light-emitting device(s) for emitting light with the first color, the light-emitting device(s) for emitting light with the second color and the light-emitting device(s) for emitting light with the third color emit light with corresponding colors sequentially and periodically.

TABLE 1

Simulation results of the display panel 100

| Refractive index of the adhesive layer 40 | Half-value angle of the light source 30 | Refractive index of the light guide plate 20 | Thickness of the light guide plate 20 | Luminous flux of a region away from the light source | Luminous flux of a region proximate to the light source | Uniformity |
|---|---|---|---|---|---|---|
| 1.50 | 45° | 1.4935 | 2 mm | 8193 | 11451 | 71.5% |
|  | 60° |  |  | 10263 | 13924 | 73.7% |
|  | 75° |  |  | 12490 | 15737 | 79.4% |
| 1.50 | 45° | 1.46008 | 2 mm | 9874 | 12552 | 78.7% |
|  | 60° |  |  | 12707 | 15281 | 83.2% |
|  | 75° |  |  | 15380 | 17623 | 87.3% |
| 1.50 | 45° | 1.43534 | 2 mm | 11494 | 13230 | 86.9% |
|  | 60° |  |  | 14679 | 16304 | 90.0% |
|  | 75° |  |  | 17623 | 19009 | 92.7% |
| 1.42 | 45° | 1.43534 | 2 mm | 11640 | 13443 | 86.6% |
|  | 60° |  |  | 14803 | 16464 | 89.9% |
|  | 75° |  |  | 17715 | 19086 | 92.8% |

It will be noted that, the orthographic projection of the light guide plate 20 in Table 1 on the plane PL is in the shape of the quadrangle. In this case, the display area of the display panel 100 is also in a shape of a quadrangle. In Table 1, the luminous flux of the region away from the light source refers to a luminous flux of a region having a width of approximately 5 mm at the center of the display panel 100 in an extending direction of the short edge W of the quadrangle, and the luminous flux of the region proximate to the light source refers to a luminous flux of a region approximately 5 mm away from the light source 30 in the extending direction of the short edge W of the quadrangle. In this case, the uniformity is a ratio of the luminous flux of the region away from the light source of the display panel 100 to the luminous flux of the region proximate to the light source of the display panel 100. In addition, the light source 30 adopts light with a wavelength of 546.1 nm during the simulation.

It can be seen that, in a case where the refractive index of the light guide plate 20, the refractive index of the adhesive layer 40 and the thickness of the light guide plate 20 are all unchanged, the larger the half-value angle of the light source 30 (for example, the half-value angle of the light source 30 is 75°), the better the uniformity of the display panel 100; in a case where the refractive index of the adhesive layer 40, the thickness of the light guide plate 20 and the half-value angle of the light source 30 are all unchanged, the less the The first color, the second color and the third color are three primary colors. For example, the first color is red, the second color is green, and the third color is blue.

Figure 15:
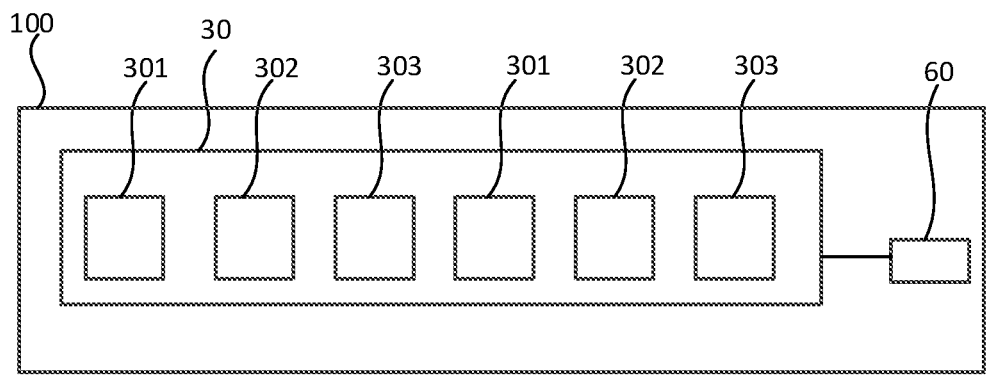
FIG. 15 is a structural diagram of yet another display panel, in accordance with some embodiments of the present disclosure.

In some embodiments, as shown in FIG. 15, the display panel 100 further includes a timing controller (Tcon). The light source 30 may be coupled to the timing controller 60, and the timing controller 60 is used to output the pulse control signal to control a work cycle of each light-emitting device in the light source 30.

In this case, the light source 30 may emit the light with the first color, the light with the second color and the light with the third color periodically, so that the light from the light source 30 passing through the light guide plate 20 and being incident on the liquid crystal cell 10 is color light. Therefore, in the display process, the liquid crystal cell 10 may exit color light for color display. In this way, there is no need to provide a color film on a light exit side of the liquid crystal cell 10, thereby saving costs.

It will be noted that those skilled in the art may adjust a duty ratio of the pulse control signal according to actual display situations to control light-emitting cycles of the light-emitting device for emitting light with the first color, the light-emitting device for emitting light with the second color and the light-emitting device for emitting light with the third color.

In some embodiments, as shown in FIG. 4, the liquid crystal cell 10 includes an array substrate 110, an opposite substrate 120 and a liquid crystal layer 130.

The opposite substrate 120 is disposed opposite to the array substrate 110 in the thickness direction of the liquid crystal cell 10. The opposite substrate 120 is farther away from the light guide plate 20 than the array substrate 110.

The liquid crystal layer 130 is disposed between the array substrate 110 and the opposite substrate 120.

For example, a thickness of the liquid crystal layer 130 is approximately 3 μm. For example, a refractive index of the liquid crystal layer 130 is approximately 1.50.

It can be understood that the first surface 21 of the light guide plate 20 is attached to a surface of the array substrate 110 away from the opposite substrate 120.

For example, a shape of an orthographic projection of the array substrate 110 on the plane PL and a shape of an orthographic projection of the opposite substrate 120 on the plane PL may be the same as the shape of the orthographic projection of the light guide plate 20 on the plane PL.

In some embodiments, as shown in FIGS. 4 to 6, 9, 10 and 12, the liquid crystal layer 130 includes liquid crystal molecules 1301 and polymer molecules 1302.

For example, the liquid crystal layer 130 may employ polymer-stabilized liquid crystal (PSLC) or polymer-dispersed liquid crystal (PDLC).

Figure 8:
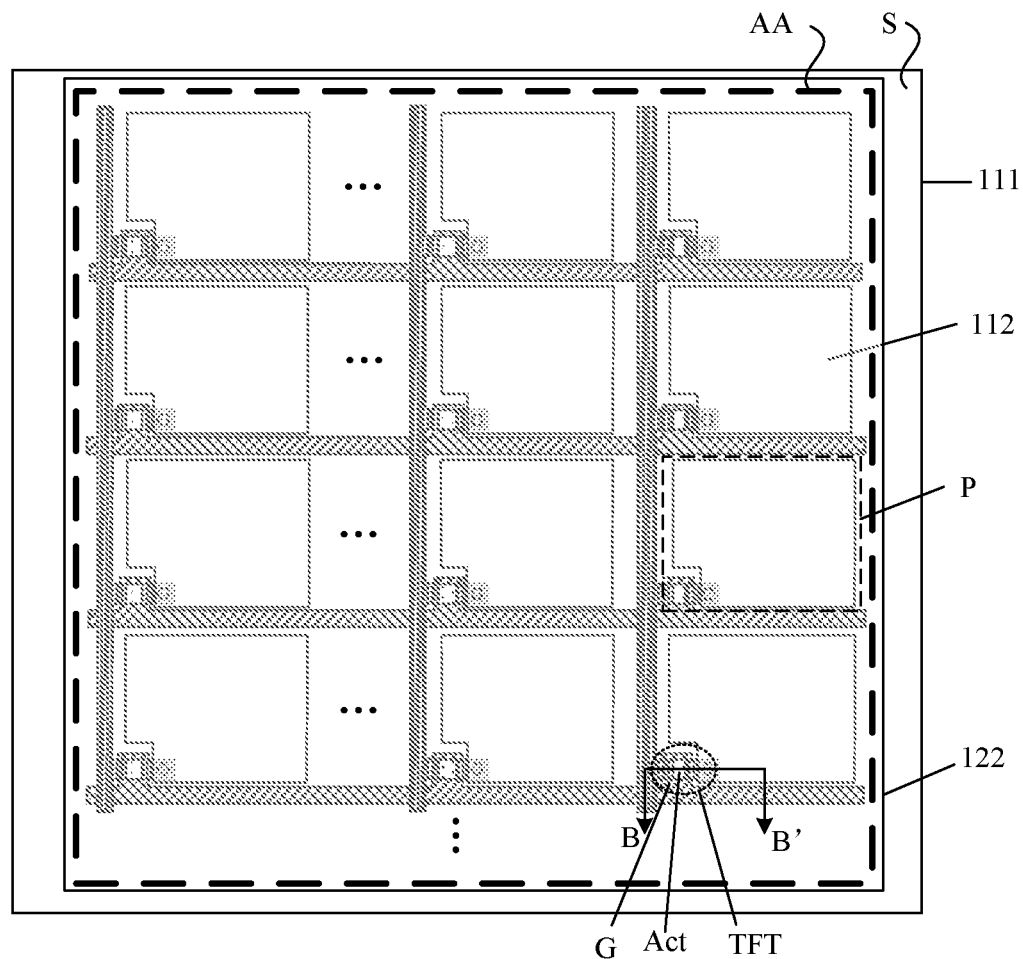
FIG. 8 is a structural diagram of a liquid crystal cell, in accordance with some embodiments of the present disclosure.

In some embodiments, as shown in FIG. 8, the liquid crystal cell 10 has a display area AA and a peripheral area S. For example, the peripheral area S is located on at least one side of the display area AA. It will be noted that the display area AA of the liquid crystal cell 10 may be considered as the above display area for the normal display of the display panel.

There are a plurality of sub-pixels P in the display area AA. The plurality of sub-pixels P include at least first color sub-pixels, second color sub-pixels and third color sub-pixels.

Figure 9:
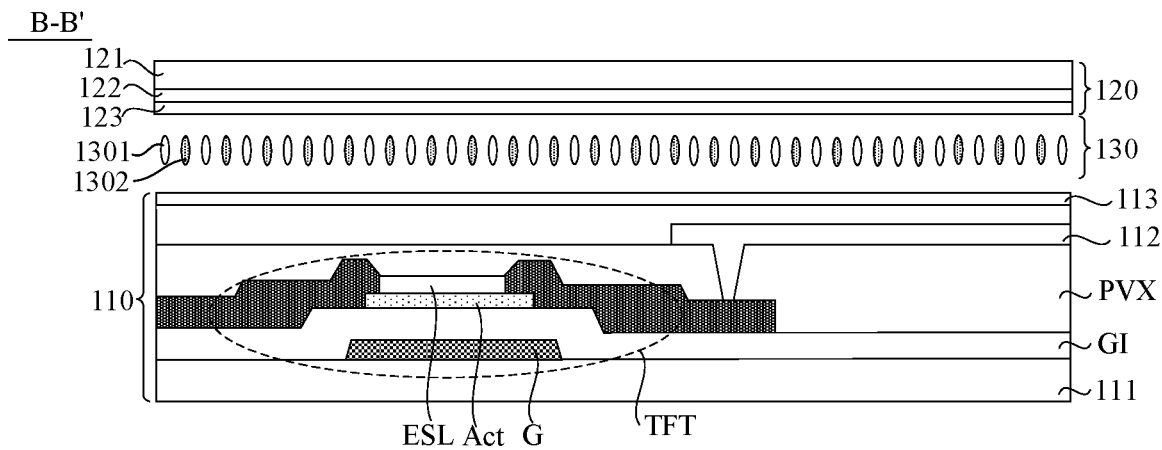
FIG. 9 is a sectional view of the liquid crystal cell in FIG. 8 taken along the line B-B'.

As shown in FIGS. 8 and 9, the array substrate 110 includes a first base 111, and a plurality of pixel electrodes 112 disposed on the first base 111 and located in the display area AA.

The plurality of pixel electrodes 112 are closer to the liquid crystal layer 130 than the first base 111. A pixel electrode 112 is located in a sub-pixel P.

The opposite substrate 120 includes a second base 121, and a common electrode 122 disposed on the second base 121. The common electrode 122 is closer to the liquid crystal layer 130 than the second base 121.

The common electrode 122 covers the entire display area AA.

For example, a material of the first base 111 and a material of the second base 121 are the same as a material of the light guide plate 20. That is, a refractive index of the first base 111 and a refractive index of the second base 121 are the same as the refractive index of the light guide plate 20.

For example, a thickness of the first base 111 and a thickness of the second base 121 are both approximately 500 μm. The pixel electrode 112 and the common electrode 122 may both be made of indium tin oxide (ITO), a refractive index of which is approximately 1.9. A thickness of the pixel electrode 112 and a thickness of the common electrode 122 are both approximately 0.07 μm.

In this case, in a case where the liquid crystal cell 10 does not perform display, no electric field is formed between the pixel electrodes 112 and the common electrode 122, and a refractive index of the liquid crystal molecules is the same as a refractive index of the polymer molecules. In this case, the light from the light source 30 propagates in the liquid crystal cell 10 by total reflection, and will not exits from a side of the opposite substrate 120 away from the array substrate 110, so that the display panel 100 is transparent, and each sub-pixel is in a transparent state. In a case where the display panel 100 performs display, the pixel electrode 112 and a portion of the common electrode 122 in a sub-pixel that is to perform display each is supplied with an electric signal to form an electric field, so that the refractive index of the liquid crystal molecules within the electric field is changed. As a result, light incident onto the liquid crystal molecules is scattered, and the scattered light exits from the side of the opposite substrate 120 away from the array substrate 110, thereby realizing the display of the display panel 100. In this case, the sub-pixel that is to perform display is in a scattering state. There is no electric field between pixel electrodes 112 and the common electrode 122 in remaining sub-pixels that are not to perform display, and thus light entering regions where the remaining sub-pixels that are not to perform display are located is totally reflected, and the remaining sub-pixels that are not to perform display are all in a transparent state.

It can be understood that, in a case where the light source 30 includes the light-emitting device(s) for emitting light with the first color, the light-emitting device(s) for emitting light with the second color and the light-emitting device(s) for emitting light with the third color, when the light-emitting device(s) for emitting light with the first color emit the light with the first color, sub-pixels that are to display the first color in the display panel 100 is in a scattering state due to electric fields, and the other sub-pixels are in a transparent state; when the light-emitting device(s) for emitting light with the second color emit the light with the second color, sub-pixels that are to display the second color in the display panel 100 is in a scattering state due to electric fields, and the other sub-pixels are in a transparent state; and when the light-emitting device(s) for emitting light with the third color emit the light with the third color, sub-pixels that are to display the third color in the display panel 100 is in a scattering state due to electric fields, and the other sub-pixels is in a transparent state.

In addition, as shown in FIG. 8, the array substrate 110 includes a thin film transistor (TFT) disposed on the first base 111 and located in the sub-pixel P. In the same sub-pixel P, the TFT is coupled to the pixel electrode 112. When the sub-pixel P performs display, the TFT in the sub-pixel P is turned on to transmit an electrical signal to the pixel electrode 112.

On this basis, as shown in FIG. 9, the array substrate 110 further includes a gate insulating layer GI located between a gate G of the TFT and an active layer Act of the TFT, a blocking layer ESL located on a side of the active layer Act away from the first base 111, and a passivation layer PVX located between the TFT and the pixel electrode 112.

For example, a material of the gate insulating layer GI, a material of the blocking layer ESL and a material of the passivation layer PVX include silicon dioxide ($SiO_2$), silicon nitride ($SiN_x$) or silicon oxynitride (SiNO). A refractive index of the silicon dioxide is approximately 1.46, a refractive index of the silicon nitride is approximately 2.0, and a refractive index of the silicon oxynitride is 1.46 to 2.0. In addition, a total thickness of the gate insulating layer GI, the blocking layer ESL and the passivation layer PVX are approximately 0.7 μm.

Figure 10:
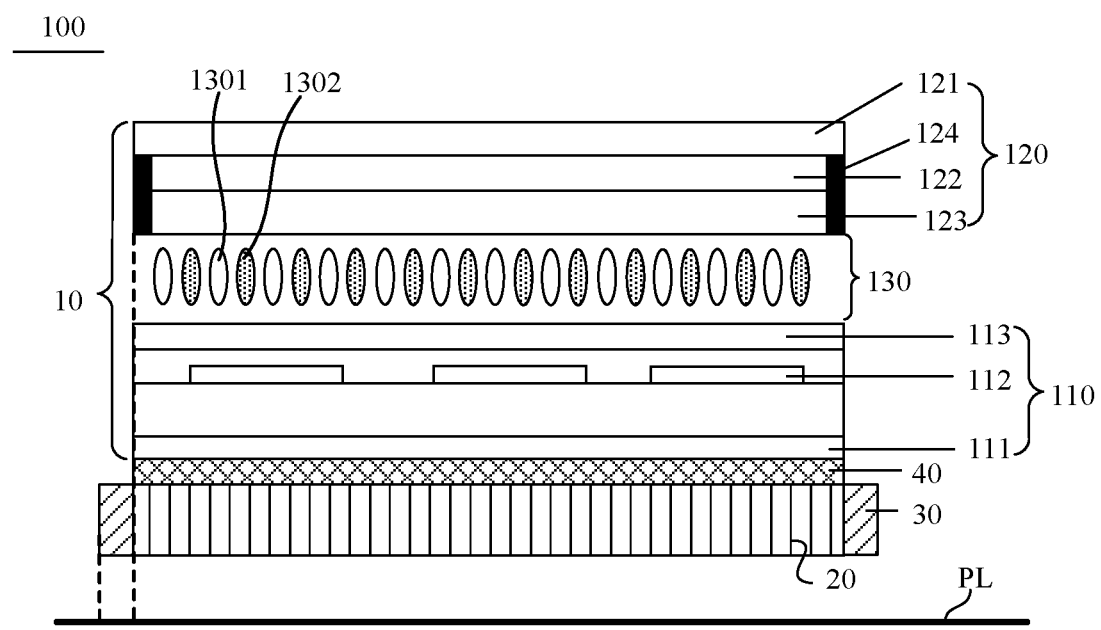
FIG. 10 is a structural diagram of yet another display panel, in accordance with some embodiments of the present disclosure.

In some embodiments, as shown in FIG. 10, the opposite substrate 120 further includes a light-shielding pattern 124 disposed on the second base 121 and located on side faces of the common electrode 122.

It will be understood that the light-shielding pattern 124 is a black matrix (BM). For example, a material of the light-shielding pattern 124 may be a resin material.

An outer edge of an orthographic projection of the light source 30 on the second base 121 exceeds an outer edge of an orthographic projection of the light-shielding pattern 124 on the second base 121.

Figure 11:
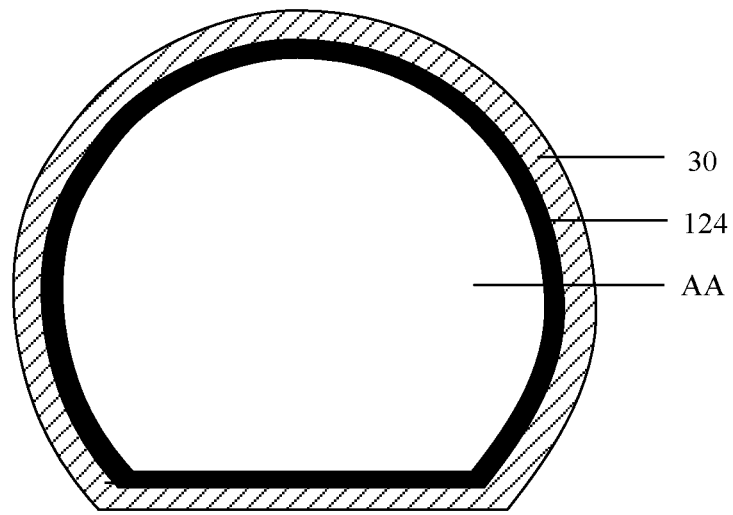
FIG. 11 is a top view of yet another display panel, in accordance with some embodiments of the present disclosure.

It will be understood that an orthographic projection of the light-shielding pattern 124 on the array substrate 110 is located outside the display area AA. For example, as shown in FIG. 11, the light-shielding pattern 124 may surround the active area AA.

In this case, the light-shielding pattern 124 may partially shield the light in the region proximate to the light source 30, which may avoid a problem that the brightness uniformity of the entire display area AA is influenced due to the fact that a brightness of the light from the light source 30 in the region proximate to the light source 30 (i.e., an edge region of the display area AA) is large.

In some embodiments, as shown in FIGS. 9 and 10, the array substrate 110 includes a first alignment layer 113, and the opposite substrate 120 includes a second alignment layer 123.

In a case where orthographic projection(s), on the plane PL, of the side face(s) where the light source 30 is located of the light guide plate 20 are straight line(s), as shown in FIGS. 4 and 5, a rubbing direction of the first alignment layer 113 and a rubbing direction of the second alignment layer 123 are both perpendicular to a normal direction ND of region(s), on which the light source 30 is provided, in the side face(s) 23 of the light guide plate 20. It will be noted that the rubbing direction of the first alignment layer 113 and the rubbing direction of the second alignment layer 123 are directions perpendicular to the normal direction ND in the plane PL.

The rubbing direction of the first alignment layer 113 and the rubbing direction of the second alignment layer 123 are antiparallel.

For example, the first alignment layer 113 and the second alignment layer 123 are both made of polyimide (PI), a refractive index of which is approximately 1.66.

In this case, the first alignment layer 113 and the second alignment layer 123 together align the liquid crystal molecules in the liquid crystal layer 130, so that an alignment direction of the liquid crystal molecules without the action of an electric field is perpendicular to the normal direction of the region(s), on which the light source 30 is provided, in the side face(s) 23 of the light guide plate 20, i.e., perpendicular to a light-emitting direction of the light source 30. In this way, in a case where the light incident onto the liquid crystal molecules is scattered, a light-emitting effect of the liquid crystal cell 10 may be improved.

Figure 12:
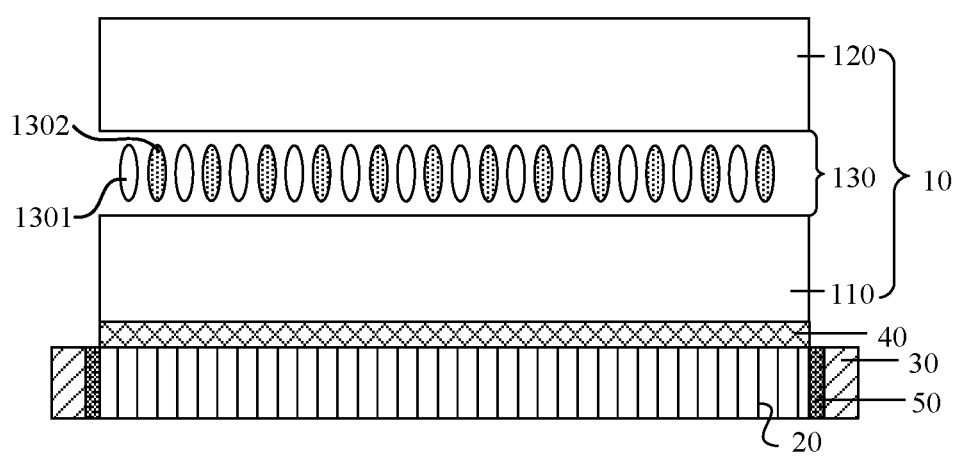
FIG. 12 is a structural diagram of yet another display panel, in accordance with some embodiments of the present disclosure.

In some embodiments, as shown in FIG. 12, the display panel 100 further includes light homogenizing film(s) 50. A light homogenizing film 50 is located between the light source 30 and the side face of the light guide plate 20.

In this case, the light homogenizing film 50 may enable the light emitted by the light source 30 to enter the light guide plate uniformly, thereby improving the uniformity of light entering the liquid crystal cell 10.

It will be noted that those skilled in the art may select the light homogenizing film 50 according to actual display requirements. For example, the light homogenizing film 50 may make light parallel to the plane PL distributed uniformly.

Figure 13:
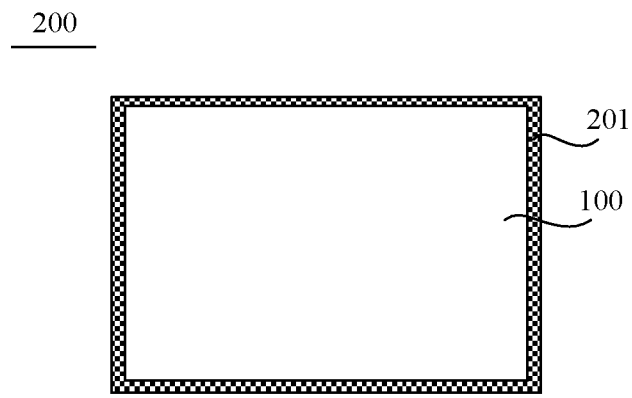
FIG. 13 is a structural diagram of a transparent display apparatus, in accordance with some embodiments of the present disclosure.

Some embodiments of the present disclosure provide a transparent display apparatus 200. As shown in FIG. 13, the transparent display apparatus 200 includes the display panel 100 in any of the above embodiments.

As shown in FIG. 13, the transparent display apparatus 200 further includes a frame 201.

For example, the frame 201 is disposed on at least one side of the display panel 100.

It will be understood that, the transparent display apparatus 200 may be any apparatus that displays an image whether in motion (e.g., a video) or stationary (e.g., a still image), and whether literal or graphical. More specifically, it is anticipated that the embodiments may be implemented in a variety of electronic apparatuses or associated with a variety of electronic apparatuses. The variety of electronic apparatuses include, but are not limited to: mobile phones, wireless apparatuses, personal data assistants (PDAs), hand-held or portable computers, global position system (GPS) receivers/navigators, cameras, MPEG-4 Part 14 (MP4) video players, video cameras, game consoles, watches, clocks, calculators, television monitors, flat panel displays, computer monitors, automobile displays (e.g., odometer displays, etc.), navigators, cockpit controllers and/or displays, displays of camera views (e.g., displays of rear-view cameras in vehicles), electronic photos, electronic billboards or signs, projectors, building structures, packaging and aesthetic structures (e.g., displays for displaying an image of a piece of jewelry), etc.

It will be noted that the transparent display apparatus 200 has the same technical effects as the display panel 100 in any of the above embodiments, and the technical effects will not be described in detail herein.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
   a liquid crystal cell;
   a light guide plate attached to a surface of the liquid crystal cell in a thickness direction of the liquid crystal cell, wherein the light guide plate includes a first surface, a second surface and side faces; in a thickness direction of the light guide plate, the first surface is opposite to the second surface, and the side faces are located between the first surface and the second surface; and the first surface is closer to the liquid crystal cell than the second surface;
   an adhesive layer disposed between the light guide plate and the liquid crystal cell, the first surface of the light guide plate being attached to the liquid crystal cell through the adhesive layer;
   at least one light source, a light source being disposed on at least a partial region in at least one side face of the light guide plate; and
   at least one light homogenizing film, a light homogenizing film being located between the light source and a side face of the light guide plate, wherein
   the light guide plate is configured such that light incident on the second surface in light from the light source is totally reflected, and then exits from the first surface, wherein the liquid crystal cell includes:

an array substrate;

an opposite substrate disposed opposite to the array substrate in the thickness direction of the liquid crystal cell, the opposite substrate being farther away from the light guide plate than the array substrate; and a liquid crystal layer disposed between the array substrate and the opposite substrate, wherein the opposite substrate includes a second base, a common electrode disposed on the second base, and a light-shielding pattern disposed on the second base and located on side faces of the common electrode, wherein the common electrode is closer to the liquid crystal layer than the second base, wherein an outer edge of an orthographic projection of the light source on the second base exceeds an outer edge of an orthographic projection of the light-shielding pattern on the second base, wherein a thickness of the light guide plate is less than or equal to 4 mm, and a refractive index of the light guide plate is in a range from 1.4 to 1.6, inclusive; a refractive index of the adhesive layer is in a range from 1.33 to 1.52, inclusive; and a half-value angle of the light source is in a range from 45° to 75°, inclusive.

2. The display panel according to claim 1, wherein an orthographic projection of the light guide plate on a plane perpendicular to a thickness direction of the display panel is in a shape of a quadrangle; and the light source is disposed on a side of a long edge of the quadrangle.

3. The display panel according to claim 2, wherein a length of at least one short edge of the quadrangle is less than or equal to 6 cm.

4. The display panel according to claim 1, wherein an orthographic projection of the light guide plate on a plane perpendicular to a thickness direction of the display panel has an arc-shaped edge; and the light source is disposed around the side faces of the light guide plate.

5. The display panel according to claim 1, wherein the light source is a Lambertian light source.

6. The display panel according to claim 1, wherein the light source includes at least one light-emitting device for emitting light with a first color, at least one light-emitting device for emitting light with a second color and at least one light-emitting device for emitting light with a third color; and the light source is configured such that, in response to pulse control signals, the light-emitting device for emitting light with the first color, the light-emitting device for emitting light with the second color and the light-emitting device for emitting light with the third color emit light with corresponding colors sequentially and periodically.

7. The display panel according to claim 6, further comprising:

a timing controller coupled to the light source, wherein the timing controller is used to output a pulse control signal to control a work cycle of each light-emitting device in the light source.

8. The display panel according to claim 1, wherein the liquid crystal layer includes liquid crystal molecules and polymer molecules.

9. The display panel according to claim 1, wherein the array substrate includes a first alignment layer;

the opposite substrate includes a second alignment layer; and at least one orthographic projection, on a plane perpendicular to a thickness direction of the display panel, of the at least one side face where the light source is located of the light guide plate is a straight line, a rubbing direction of the first alignment layer and a rubbing direction of the second alignment layer are both perpendicular to a normal direction of at least one region, on which the light source is provided, in a side face of the light guide plate.

10. A transparent display apparatus, comprising the display panel according to claim 1.

11. The display panel according to claim 1, wherein a shape of a display area for normal display of the display panel is approximately the same as a shape of an orthographic projection of the light guide plate on a plane perpendicular to a thickness direction of the display panel.

12. The display panel according to claim 11, wherein an area of the display area for normal display of the display panel is less than an area of the orthographic projection of the light guide plate on the plane.

* * * * *